H. VIERTEL.
SEARCH LIGHT, PROJECTOR, AND THE LIKE.
APPLICATION FILED MAR. 10, 1909.

969,814.

Patented Sept. 13, 1910.
2 SHEETS—SHEET 1.

Witnesses
H. H. Knight
Ray J. Ernst

Inventor
Hermann Viertel
by Knight Bros
Attys.

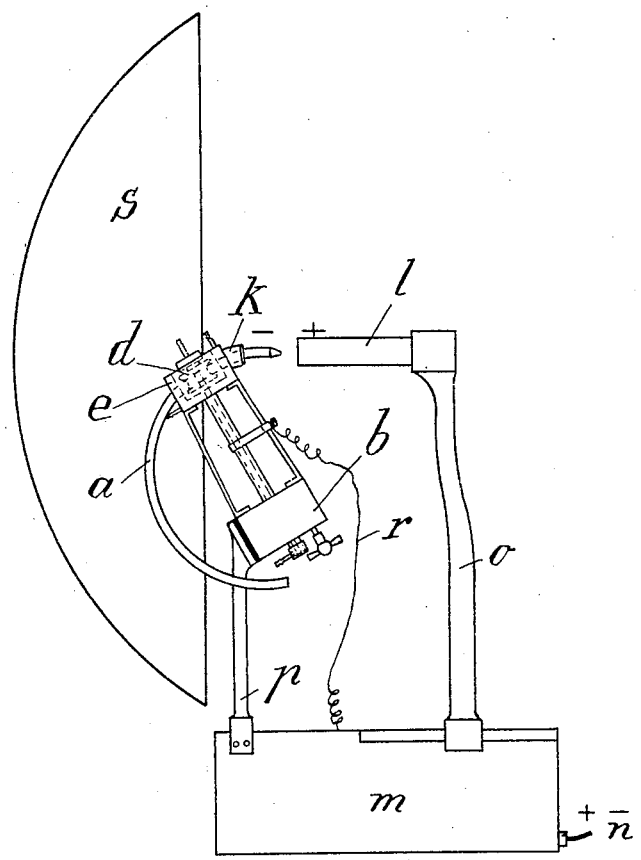

UNITED STATES PATENT OFFICE.

HERMANN VIERTEL, OF BERLIN, GERMANY, ASSIGNOR TO GEBRÜDER SIEMENS & CO., OF LICHTENBERG, NEAR BERLIN, GERMANY.

SEARCH-LIGHT, PROJECTOR, AND THE LIKE.

969,814.   Specification of Letters Patent.   Patented Sept. 13, 1910.

Application filed March 10, 1909. Serial No. 482,496.

*To all whom it may concern:*

Be it known that I, HERMANN VIERTEL, a subject of the German Emperor, and residing at Berlin, Empire of Germany, have invented certain new and useful Improvements in Search-Lights, Projectors, and the Like, of which the following is a specification.

My present invention relates generally to search-lights, projectors and the like, and a primary object is to provide an improved arrangement of the electrodes therefor.

In my United States patent application Serial No. 375,644 filed May 25, 1907, I have described an arrangement of electrodes for search-lights, projectors and the like, in which the cathode consists of a substantially smaller carbon rod than the anode and is surrounded by a tube; the purpose of the tube is to diminish the resistance of the cathode and to protect the thin rod from the influence of the arc. Now the relatively long cathode or negative electrode cannot be arranged in the space between the focus and face of the mirror, so that the mirror must be drilled. In order to avoid drilling a hole in the mirror and nevertheless to be able to retain the long thin cathode which burns away continuously in a fine point and thus enables a favorable employment of the illuminating field of the positive crator, in accordance with the invention the thin negative electrode is formed as a curved rod, so that it can be arranged in the space between the focus and face of the mirror. The negative carbon can be fed in a manner already known in connection with the ordinary use of curved electrodes. The protecting tube arranged near the arc, the purpose of which is fully and clearly described in my above mentioned patent application, is formed in a curve having the same radius as the carbon, and may be provided at its end facing the arc with a protecting cap of fireproof material and, in addition, may be cooled by liquids or gases passed into its interior.

Figure 1:
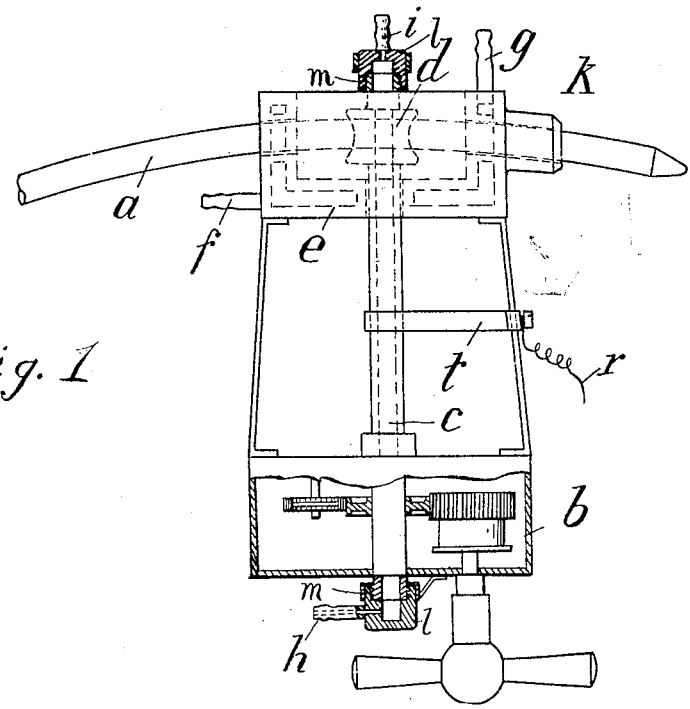
Figure 2:
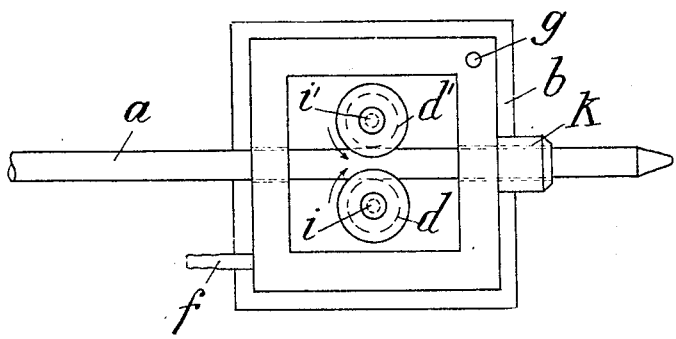

In order that my invention may be clearly understood reference will be made to the accompanying drawings in which one embodiment is represented by way of example, and in which:

Figure 1 is an elevation, and Fig. 2 a plan showing the feed mechanism and the protecting tube for the bent negative carbon, whereas Fig. 3 is an elevation showing the general arrangement of both electrodes and their regulating mechanisms in a search-light.

Referring to the drawings and firstly particularly to Figs. 1 and 2, the cathode $a$ is fed by clockwork in the box $b$ which drives the shafts $c$; the latter carry the clamping wheels $d$, $d'$, between which the cathode is guided. The clamping wheels are located within the protecting tube which is shown constructed as a double-walled cooling vessel $e$ (the inner wall being shown by dotted lines in Fig. 1) carrying at its front end a fireproof cap $k$. The cooling medium is supplied to the cooler $e$ through the socket $f$ and flows away through the socket $g$. The driving shafts $c$ are also hollow and may be traversed by a cooling medium which is supplied below through sockets $h$ and flows away through sockets $i$, $i'$. $t$ indicates a brush or sliding contact for supplying current from the conductor $r$ through one of the shafts $c$ to the thin negative electrode.

In Fig. 3 the feed mechanism for the thin curved cathode $a$ is represented in combination with the large anode $l$ and a mirror $s$ of a search-light or the like. Any suitable known mechanism for regulating the feed of the positive electrode $l$, such as is illustrated and described in my United States patent application Serial No. 375,644, for example, is arranged in the box $m$ into which the feeders $n$ are led. The anode $l$ is carried by the holder $o$ which is connected with the positive feeder.

The above described feeding mechanism for the cathode is carried on but insulated from the support $p$. Current is supplied to the cathode from the negative feeder by way of the conductor $r$, contact $t$, shaft $c$ and clamping wheel $d$.

I claim:

1. In an arc lamp of the character described, the combination with a mirror, and a positive electrode disposed with its arcing end near the focus of said mirror; of a negative electrode substantially thinner than said positive electrode and longer than the focal length of said mirror, said negative electrode being curved and disposed between said mirror and its focus in non-intersecting relation to said mirror.

2. In a search-light, projector or like arc-lamp having a mirror, the combination, with the mirror, and a positive electrode having one end near the focus of the mirror, of a long, curved negative electrode of substantially smaller diameter than the positive electrode arranged between the focus and face of the mirror, substantially as shown, for the purpose specified.

3. In an arc lamp of the character described, the combination with the mirror, and the positive electrode having its arcing end disposed toward the mirror and near the focus thereof; of a relatively thinner curved negative electrode and a feeding mechanism therefor adapted to support the same between said positive electrode and mirror and feed it through an arc of a circle toward the positive electrode.

4. In an arc lamp of the character described, the combination with a mirror, and a positive electrode disposed with its arc end toward said mirror and near the focus thereof; of a curved relatively thinner negative electrode, rotary water cooled shafts, feed rollers mounted thereon and engaging said negative electrode to feed the same through the arc of a circle toward said positive electrode, means for supplying current to said negative electrode through said feed device, and a water jacket near the arc end of said negative electrode.

In testimony whereof I have signed my name to this specification in the presence of two witnesses.

HERMANN VIERTEL.

Witnesses:
  HENRY HASPER,
  WOLDEMAR HAUPT.